Patented Sept. 24, 1935

2,015,088

UNITED STATES PATENT OFFICE 2,015,088

POLYBASIC ACID ESTER OF HIGHER ALCOHOLS

Ebenezer Emmet Reid, Baltimore, Md., assignor to E. I. du Pont de Nemours & Company, Wilmington, Del., a corporation of Delaware No Drawing. Application October 14, 1932, Serial No. 637,784

11 Claims. (Cl. 260—103)

This invention relates to new compositions of matter, and more particularly it pertains to polycarboxylic acid esters of branched carbon open-chain primary alcohols containing at least six carbon atoms.

An object of this invention is the preparation of new polycarboxylic acid esters of primary alcohols containing at least six carbon atoms and having a branched carbon open-chain. Other objects of the invention will become apparent from the following description.

The novel esters to which the present invention pertains may be prepared by reacting polycarboxylic acids, anhydrides or chlorides, with branched carbon open-chain primary alcohols containing at least six carbon atoms, or by reacting sodium salts of the acids with chlorides or other halide esters of the alcohols under suitable conditions or by ester interchange of these alcohols with esters of more volatile alcohols.

The following examples which are illustrative only, typify the methods used in the preparation of these esters.

Example 1

A mixture of alcohols boiling above 160° C., all of which have a branched carbon chain structure and which were obtained in the catalytic synthesis of methanol from CO and $H_2$, which mixture contains various amounts of the following alcohols: 2,4,dimethyl-1-pentanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, 3-methyl-2-hexanol, 3-methyl-2-heptanol, 5-methyl-3-octanol, 3-ethyl-2-nonanol, etc. may be used in the preparation of a neutral phthalate as follows: A mixture containing 400 grams phthalic anhydride, 780 grams of the above alcohols, 200 grams toluol, and 10 grams sulfuric acid, is heated in an apparatus designed to separate water from the distillate and to return the toluol to the reaction ask. Distillation is continued until the theoretical amount of water has been removed. The products is washed with sodium carbonate solution to remove the acid and is then refined by heating under vacuum in the presence of decolorizing carbon until the temperature reaches approximately 180° C. at 50 mm. The product is filtered to remove the carbon and is then ready for use. The product as above prepared comprises a mixture of phthalic esters in which at least one carboxyl group has been esterified by the branched carbon-chain alcohols in the mixture. Such an ester mixture is useful as a plasticizer for cellulose nitrate and cellulose ether compositions.

Example 2

A benzene solution of mixed alcohols (obtained from the methanol synthesis) boiling above 135° (the composition of which is essentially the same as the mixture used in Example 1 and containing in addition 2-methyl-1-pentanol) is mixed with an equimolar proportion of phthalic anhydride and heated overnight in a steam bath. The solution is then cooled to 5 to 10° to precipitate unchanged phthalic anhydride which is filtered off. The benzene solution is then extracted with 10% sodium hydroxide solution in an amount equivalent to the phthalic anhydride which is reacted. After the alkali and benzene have been thoroughly mixed they are allowed to separate. The lower or aqueous layer contains the sodium salts of the acid phthalate ester of the primary alcohols contained in the original mixture, while the upper layer contains the secondary alcohols dissolved in benzene. The acid ester may be obtained by the addition of mineral acid to the aqueous solution.

Example 3

A mixture containing the above acid phthalate ester prepared as described in Example 2 and butyl alcohol in equal molar proportions is dissolved in toluol with the addition of a small amount of sulfuric acid as a catalyst and heated in an apparatus described in Example 1. After removal of the theoretical amount of water, the product is refined as in Example 1. The resultant product is a mixed butyl higher alcohol ester of phthalic acid.

Example 4

A mixture containing 150 grams phthalic anhydride, 300 grams of 2-methyl-pentanol-1, 200 grams ethylene dichloride, 5 grams sulfuric acid (specific gravity 1.84) is heated to boiling in an apparatus as described in Example 1. The product is refined as in Example 1. The neutral ester thus obtained is very useful as a plasticizer for cellulose derivative compositions.

In place of the 2-methyl-pentanol-1 used in Example 4, one may substitute any of the branched carbon chain primary alcohols containing 6 to 14 carbon atoms, including 2,4-dimethyl-1-pentanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6, trimethyl-1-decanol, 2,4,6,8,tetramethyl-1-decanol, or one may use a mixture of primary alcohols within this range. The products obtained are equally valuable as plasticizers. In the preparation of compounds similar to that described in Example 3, one may use any alcohol in place of butanol for the second step of the esterification, e. g., cyclohexanol, benzyl alcohol, hexahydrobenzyl alcohol, ethyl alcohol, octyl alcohol, decyl alcohol, tetrahydrofurfuryl alcohol, monoalkyl and aryl ethers of glycols and polyglycols, dialkyl or diaryl ethers of glycerol, or one may use secondary alcohols including those commonly found in higher alcohols from the methanol synthesis, such as 2-methyl-3-pentanol, 3-methyl-2-pentanol, 2,4,dimethyl-3-pentanol, 3,4,dimethyl-2-pentanol, 3-methyl-2-hexanol, 3-methyl-2-heptanol, 5-methyl-3-octanol, 3-ethyl-2-nonanol, etc.

In preparing the mixture of alcohols, the use of which is described in Example 1, by way of catalytic synthesis from carbon monoxide and hydrogen, this mixture of alcohols, due to the nature of the methanol synthesis reaction, contains in association therewith, numerous organic compounds other than alcohols, which for the most part contain oxygen in substantial amounts. This fact is readily recognized from the knowledge possessed by the art regarding the nature of the products produced during the methanol synthesis. The scope of the invention contemplates the use of these crude alcoholic mixtures in preparing esters of the character described.

The esters prepared as above described are all liquids varying from water-white to light amber in color, depending on their purity. They are high boiling and quite compatible with cellulose derivatives. In fact, they are more desirable for use with cellulose derivatives than similar esters prepared from straight chain normal alcohols of the same molecular weight. Although Examples 1 to 4 include only phthalic acid and phthalic anhydride, any polycarboxylic acid may be used including adipic, succinic, sebacic, citric, tartaric, trimesic, quinolinic, hexahydrophthalic, tetrahydrophthalic, etc.

The esters of the present invention may be used as plasticizers with cellulose derivatives such as cellulose nitrate, cellulose acetate, cellulose propionate, cellulose butyrate, cellulose acetobutyrate, cellulose nitroacetate, and other cellulose esters, ethyl cellulose, benzyl cellulose, and other cellulose ethers, with or without resins such as damar, ester gum, polyhydric alcohol-polybasic acid resins, and the like, and oils such as castor, Chinawood, linseed, soya bean, cottonseed oil, and the like, and pigments. Additional plasticizers known to the art such as triacetin, triphenyl phosphate, dibutyl phthalate, camphor, tricresyl phosphate, and the like, and solvents such as alcohols for cellulose nitrate compositions, acetone for cellulose acetate compositions, and toluol-alcohol for cellulose ethers may likewise be used.

The compounds herein disclosed may likewise be used as plasticizers and/or softeners for natural resins such as damar, sandarac, Congo, elemi, guaiac, kauri, rosin, etc., and synthetic resins such as polyhydric alcohol-polybasic acid resins (glyptals), phenol-aldehyde resins, urea-formaldehyde resins, vinyl resins, ester gums, etc. They may be used alone or in conjunction with other modifiers for the resin, such as waxes, etc.

The method of preparation of the compounds described above is capable of considerable variation. In the esterification reaction catalysts other than those mentioned may be used. Solvents other than those mentioned may be used to remove the water. In some cases solvents may be used without the use of a catalyst, and in still other cases neither solvent nor catalyst may be used. Also one may react a chloride or simple ester of the acid with the branched chain primary alcohols or the chloride of the alcohol with a salt of the acid under suitable conditions. The term "polycarboxylic acid ester of branched carbon chain primary alcohols containing at least six carbon atoms" as used herein is intended to apply to compounds having the following nucleus:

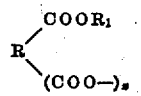

in which R is a polyvalent radical, $R_1$ is the radical of a branched carbon open-chain alcohol containing at least six carbon atoms and $x$ is one or more.

The term "branched carbon open-chain alcohol" is intended to apply to open-chain alcohols, the carbinol group of which is attached to a branched carbon radical. The alcohols within this class with which the invention is most particularly concerned are those having from six to fourteen carbon atoms.

The novel esters may be used in the preparation of all types of compositions containing cellulose esters and/or ethers. They may be used in the preparation of lacquers for coating metal and wood, dopes for coating fabrics, moistureproof lacquers for coating regenerated cellulose, and in plastic compositions to be used in the preparation of toiletware novelties, sheeting, rods, tubes, safety glass interlayer, etc.

The advantage of this invention is that it furnishes high boiling, water-resistant plasticizers for cellulose derivatives, and due to their low vapor pressure they give permanently flexible products having good durability. These compounds are characterized by being more satisfactory plasticizers for cellulose derivatives than compounds prepared from straight chain normal alcohols of the same molar weight. For example, the di-phthalate of 2,4-dimethyl hexanol-1 gives a good water-resistant coating when used as a plasticizer for cellulose nitrate, and the composition does not have a greasy feel, whereas di-n-octyl phthalate, although giving a good water-resistant composition when used as a plasticizer for cellulose nitrate, if used in sufficient quantity to flexibilize the film has a somewhat greasy feel. This is especially true of the esters of higher straight chain alcohols, such as lauryl esters.

The above description and examples are to be taken as illustrative only and not as limiting the scope of the invention. Any modification or variation therefrom which conforms to the spirit of the invention is intended to be included within the scope of the claims.

I claim:
1. A mixture of poly-carboxylic acid esters containing the following nucleus:

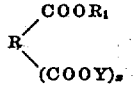

in which R is a polyvalent radical, $R_1$ is a saturated branched carbon open-chain primary alkyl radical containing at least six carbon atoms, Y is hydrogen or a hydrocarbon radical and $x$ is at least one, said mixed esters being prepared from a mixture containing largely primary branch chain alcohols of six to fourteen carbon atoms.

2. A mixture of poly-carboxylic acid esters containing the following nucleus:

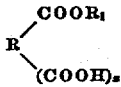

in which R is a polyvalent radical, and $R_1$ is a saturated branched carbon open-chain primary alkyl radical containing at least six carbon atoms and $x$ is at least one, said mixed esters being prepared from a mixture containing largely primary branch chain alcohols of six to fourteen carbon atoms.

3. A mixture of poly-carboxylic acid esters containing the following nucleus:

in which R is a polyvalent radical, and $R_1$ is the radical of a branched carbon open-chain primary alcohol containing at least six carbon atoms, Y is hydrogen or a hydrocarbon radical and $x$ is at least one, said mixed esters being prepared from a mixture of alcohols prepared by the catalytic hydrogenation of carbonic oxides at an elevated temperature and pressure.

4. A mixture of poly-carboxylic acid esters containing the following nucleus:

in which R is a polyvalent radical, and $R_1$ is the radical of a branched carbon open-chain primary alcohol having at least six carbon atoms and $x$ is at least one, said mixed esters being prepared from a mixture of alcohols prepared by the catalytic hydrogenaiton of carbonic oxides at an elevated temperature and pressure.

5. A mixture of phthalic esters obtainable by heating a mixture comprising phthalic anhydride, and mixed alcohols boiling above 135° C., said mixed alcohols being obtained by the hydrogenation of carbon oxide at an elevated temperature and pressure.

6. An ester of a polycarboxylic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, and 2-methyl-1-pentanol.

7. An ester of a dicarboxylic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,-trimethyl-1-decanol, 2,4,6,8,tetramethyl-1-decanol, and 2-methyl-1-pentanol.

8. An ester of phthalic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,-trimethyl-1-decanol, 2,4,6,8,tetramethyl-1-decanol, and 2-methyl-1-pentanol.

9. A 2-methyl-n-amyl-phthalate.
10. A 2-methyl-n-hexyl phthalate.
11. A 5-methyl-n-heptyl phthalate.

EBENEZER EMMET REID.

---

CERTIFICATE OF CORRECTION.

Patent No. 2,015,088.    September 24, 1935.

EBENEZER EMMET REID.

It is hereby certified that error appears in the printed specification of the above numbered patent requiring correction as follows: Page 1, first column, line 44, for "ask" read flask; and that the said Letters Patent should be read with this correction therein that the same may conform to the record of the case in the Patent Office.

Signed and sealed this 19th day of November, A. D. 1935.

Leslie Frazer
Acting Commissioner of Patents.

(Seal)

one, said mixed esters being prepared from a mixture containing largely primary branch chain alcohols of six to fourteen carbon atoms.

2. A mixture of poly-carboxylic acid esters containing the following nucleus:

$$R\begin{matrix}COOR_1\\(COOH)_x\end{matrix}$$

in which R is a polyvalent radical, and $R_1$ is a saturated branched carbon open-chain primary alkyl radical containing at least six carbon atoms and $x$ is at least one, said mixed esters being prepared from a mixture containing largely primary branch chain alcohols of six to fourteen carbon atoms.

3. A mixture of poly-carboxylic acid esters containing the following nucleus:

$$R\begin{matrix}COOR_1\\(COOY)_x\end{matrix}$$

in which R is a polyvalent radical, and $R_1$ is the radical of a branched carbon open-chain primary alcohol containing at least six carbon atoms, Y is hydrogen or a hydrocarbon radical and $x$ is at least one, said mixed esters being prepared from a mixture of alcohols prepared by the catalytic hydrogenation of carbonic oxides at an elevated temperature and pressure.

4. A mixture of poly-carboxylic acid esters containing the following nucleus:

$$R\begin{matrix}COOR_1\\(COOH)_x\end{matrix}$$

in which R is a polyvalent radical, and $R_1$ is the radical of a branched carbon open-chain primary alcohol having at least six carbon atoms and $x$ is at least one, said mixed esters being prepared from a mixture of alcohols prepared by the catalytic hydrogenaiton of carbonic oxides at an elevated temperature and pressure.

5. A mixture of phthalic esters obtainable by heating a mixture comprising phthalic anhydride, and mixed alcohols boiling above 135° C., said mixed alcohols being obtained by the hydrogenation of carbon oxide at an elevated temperature and pressure.

6. An ester of a polycarboxylic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,trimethyl-1-decanol, 2,4,6,8,tetramethyl-1-decanol, and 2-methyl-1-pentanol.

7. An ester of a dicarboxylic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,-trimethyl-1-decanol, 2,4,6,8,tetramethyl-1-decanol, and 2-methyl-1-pentanol.

8. An ester of phthalic acid wherein the hydrogen atom of at least one carboxyl group is replaced by the radical of a saturated branched carbon open-chain primary alcohol containing six to fourteen carbon atoms, said alcohol being obtainable by the catalytic hydrogenation of carbon oxides and being taken from the class consisting of 2,4,dimethyl-1-pentanol, 2-methyl-1-hexanol, 4-methyl-1-hexanol, 2,4,dimethyl-1-hexanol, 5-methyl-1-heptanol, 4,6,dimethyl-1-heptanol, 2,6,dimethyl-1-octanol, 2,4,6,trimethyl-1-octanol, 2-ethyl-4-6-dimethyl-1-octanol, 2,4,6,-trimethyl-1-decanol, 2,4,6,8,tetramethyl-1-decanol, and 2-methyl-1-pentanol.

9. A 2-methyl-n-amyl-phthalate.
10. A 2-methyl-n-hexyl phthalate.
11. A 5-methyl-n-heptyl phthalate.

EBENEZER EMMET REID.

CERTIFICATE OF CORRECTION.

Patent No. 2,015,088.   September 24, 1935.

EBENEZER EMMET REID.

It is hereby certified that error appears in the printed specification of the above numbered patent requiring correction as follows: Page 1, first column, line 44, for "ask" read flask; and that the said Letters Patent should be read with this correction therein that the same may conform to the record of the case in the Patent Office.

Signed and sealed this 19th day of November, A. D. 1935.

(Seal)

Leslie Frazer
Acting Commissioner of Patents.